(12) United States Patent
Guo et al.

(10) Patent No.: US 11,797,064 B2
(45) Date of Patent: Oct. 24, 2023

(54) HARD DISK FIXING DEVICE AND MAIN UNIT

(71) Applicant: SHANGHAI MORUAN TELECOM TECHNOLOGY CO., LTD., Shanghai (CN)

(72) Inventors: Yuhua Guo, Shanghai (CN); Haichen Zhou, Shanghai (CN)

(73) Assignee: SHANGHAI MORUAN TELECOM TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/784,771

(22) PCT Filed: Dec. 31, 2020

(86) PCT No.: PCT/CN2020/142394
§ 371 (c)(1),
(2) Date: Jun. 13, 2022

(87) PCT Pub. No.: WO2021/232821
PCT Pub. Date: Nov. 25, 2021

(65) Prior Publication Data
US 2023/0008872 A1      Jan. 12, 2023

(30) Foreign Application Priority Data

May 22, 2020   (CN) .......................... 202010443233.4

(51) Int. Cl.
*G06F 1/18*   (2006.01)

(52) U.S. Cl.
CPC ................... *G06F 1/187* (2013.01)

(58) Field of Classification Search
CPC ...... G06F 1/187; G11B 33/124; G11B 33/128
See application file for complete search history.

(56) References Cited

U.S. PATENT DOCUMENTS

| 7,384,106 B2 * | 6/2008 | Lan ......................... G06F 1/187 |
| | | 312/223.2 |
| 7,830,656 B2 * | 11/2010 | Ding ....................... G06F 1/187 |
| | | 361/679.37 |

(Continued)

FOREIGN PATENT DOCUMENTS

| CN | 201750789 U | 2/2011 |
| CN | 109557981 A | 4/2019 |

(Continued)

OTHER PUBLICATIONS

International Search Report for PCT/CN2020/142394 dated Mar. 26, 2021.

(Continued)

*Primary Examiner* — James Wu
(74) *Attorney, Agent, or Firm* — The PL Law Group, PLLC (57) ABSTRACT

A hard disk fixing device includes a handle, a locking member, a transmission member and a hard disk holder. A first side surface of the hard disk holder is provided with a locking hole, which is used for a fixing member of a hard disk to protrude from the hard disk holder. The handle is connected with the first side surface. The transmission member is rotatably connected with the handle. The locking member is rotatably connected with the transmission member. A locking bayonet on the locking member is engaged with the fixing member.

11 Claims, 7 Drawing Sheets

(56) References Cited

U.S. PATENT DOCUMENTS

| | | | | | |
|---|---|---|---|---|---|
| 8,074,942 | B2* | 12/2011 | Huang | ................... | G06F 1/187 |
| | | | | | 248/510 |
| 8,369,089 | B2* | 2/2013 | Yang | ...................... | G06F 1/187 |
| | | | | | 248/161 |
| 8,437,127 | B2* | 5/2013 | Wang | ..................... | G06F 1/187 |
| | | | | | 361/679.33 |

FOREIGN PATENT DOCUMENTS

| CN | 209859617 U | 12/2019 |
|---|---|---|
| CN | 210005973 U | 1/2020 |
| CN | 111625056 A | 9/2020 |
| JP | H01-192051 A | 8/1989 |
| JP | H06-215553 A | 8/1994 |
| JP | 2006-294201 A | 10/2006 |
| JP | 2013-008418 A | 1/2013 |
| KR | 10-2013-0039374 A | 4/2013 |

OTHER PUBLICATIONS

Office action dated Jul. 4, 2023 from Japan Intellectual Property Office in a counterpart Japanese Patent Application No. 2022-561219 (all the cited references are listed in this IDS.) (English translation is also submitted herewith.).

* cited by examiner

Prior Art

FIG. 1

Prior Art

FIG. 2

Prior Art

HARD DISK FIXING DEVICE AND MAIN UNIT

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/CN2020/142394, filed Dec. 31, 2020, which claims priority to the benefit of Chinese Patent Application No. 202010443233.4 filed in the Chinese Intellectual Property Office on May 22, 2020, the entire contents of which are incorporated herein by reference.

BACKGROUND

1. Technical Field

The present application relates to the technical field of computers, and more specifically, to a hard disk fixing device and a main unit.

2. Background of the Invention

With the rapid development of digital technology, the market imposes higher requirements on the computing power and data storage capacity of computers and servers. Therefore, it is quite common for one computer or server to be equipped with multiple hard disks. Hard disks are generally installed in a hard disk holder and are usually fixed in the hard disk holder in two ways: screw fixing and screwless hard disk holder methods.

Figure 1:
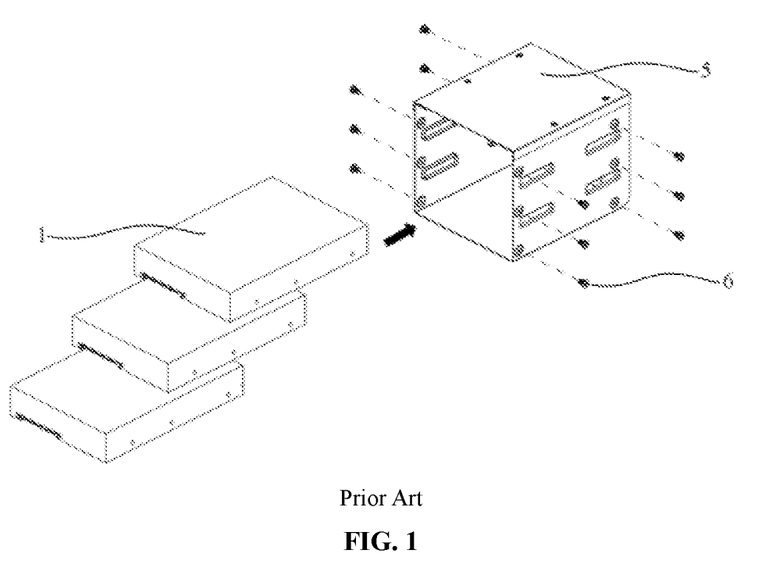
FIG. 1 shows an installation schematic view of a screw fixing method in the prior art.

With reference to FIG. 1, this figure shows a screw fixing method. Screw holes are respectively provided on two opposite side walls of a hard disk 1, and installation holes are respectively provided in areas of a hard disk holder 5 opposite to the screw holes. When the hard disk 1 needs to be installed in the hard disk holder 5, the hard disk 1 is placed in the hard disk holder 5, the installation holes of the hard disk holder 5 are aligned with the screw holes of the hard disk 1, and a screw 6 is connected to the screw hole through the installation hole. With this fixing method, a single hard disk generally needs to be locked by two to four screws, resulting in low installation efficiency. In addition, when the hard disk needs to be repaired, various screws need to be removed by means of tools, resulting in low maintenance efficiency. Moreover, if the operating space in a chassis for installing the hard disk holder 5 is limited, it might be necessary to first disassemble the hard disk holder 5 from the chassis, which further reduces the maintenance efficiency.

Figure 2:
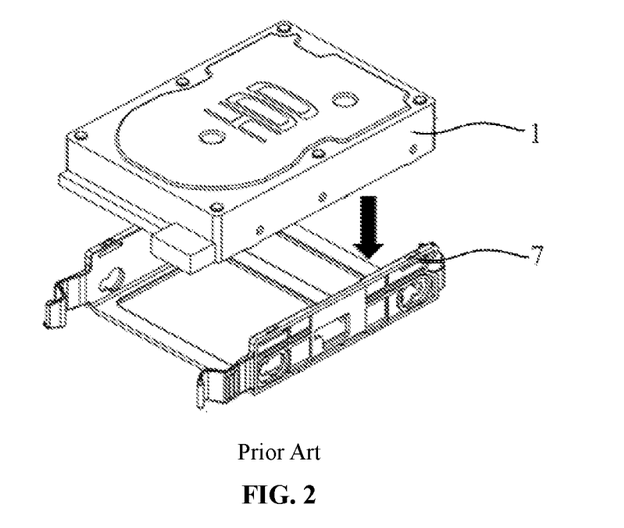
FIG. 2 shows an installation schematic view of a hard disk and a hard disk bracket in the prior art.
Figure 3:
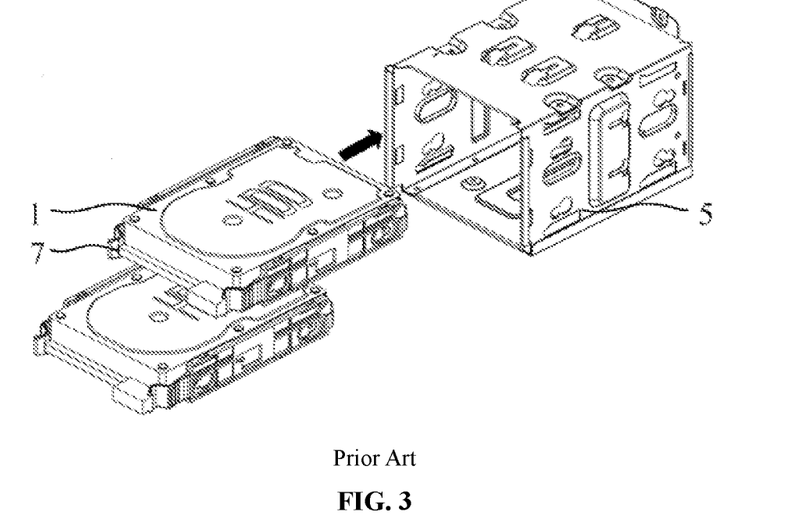
FIG. 3 shows an installation schematic view of a hard disk bracket and a hard disk holder in the prior art.

When the hard disk holder installation method is adopted, a hard disk bracket 7 is provided with a pin for fixing the hard disk 1. When the hard disk 1 needs to be installed in the hard disk holder 5, first the hard disk 1 is installed in the hard disk bracket 7 as shown in FIG. 2, and then the hard disk bracket 7 is fastened in the hard disk holder 5 as shown in FIG. 3. With this fixing method, each hard disk needs to be installed in the corresponding hard disk bracket 7 first, and then the assembled hard disk 1 and hard disk bracket 7 are installed in the hard disk holder 5. The installation process of hard disks is complicated, resulting in low efficiency of installation and maintenance of hard disks.

To sum up, the above two hard disk fixing methods have low efficiency in hard disk installation and maintenance.

SUMMARY

In view of the above problems, the embodiments of the present application provide a hard disk fixing device and a main unit, so as to solve the low efficiency in hard disk installation and maintenance.

To achieve the above objective, some embodiments of the present application provide technical solutions as below:

An embodiment of the present application provides a hard disk fixing device, including a hard disk holder, a handle, a transmission member and a locking member. The hard disk holder is provided with a hard disk accommodating cavity extending from its top to bottom. The hard disk accommodating cavity is used to install a hard disk with a fixing member. A first side surface of the hard disk holder is provided with a locking hole facing and connected with the hard disk accommodating cavity. The locking hole is used for the fixing member to protrude from the hard disk holder. The handle is connected with the first side surface of the hard disk holder through a rotating shaft. The transmission member is rotatably connected with the handle, and a rotation center line of the transmission member rotating relative to the handle is parallel to a center line of the rotating shaft. The locking member is rotatably connected with the transmission member, and a rotation center line of the locking member rotating relative to the transmission member is parallel to a center line of the rotating shaft. The locking member is provided with a locking bayonet. The locking bayonet is engaged with the portion of the fixing member which protrudes from the hard disk holder.

In the hard disk fixing device provided in the embodiment of the present application, the handle is rotated to drive the transmission member to move, so that the locking member is driven to move relative to the hard disk holder, and the locking bayonet of the locking member comes close to the locking hole on the hard disk holder. The locking bayonet of the locking member is engaged with the fixing member installed on the hard disk, thereby realizing the fixing of the hard disk in the hard disk holder. When the handle rotates in the opposite direction, the handle drives the transmission member to move in the opposite direction, and the transmission member drives the locking member to move in the opposite direction relative to the hard disk holder, so as to cause the locking bayonet of the locking member to be far away from the locking hole on the hard disk holder and to release the locking of the hard disk by the locking bayonet of the locking member, thereby facilitating the loosening of the hard disk from the hard disk holder. By means of the above hard disk fixing device, when the hard disk needs to be installed in the hard disk holder or needs to be replaced or repaired, screws do not need to be screwed many times, and there are fewer installation steps, so the installation and maintenance efficiency of the hard disk is high.

In some embodiments, the locking member is provided with a through hole. The through hole penetrates the locking member along the thickness direction of the locking member. The side of the through hole facing the bottom of the hard disk holder is provided with a notch. The notch and the through hole are connected with each other to form the locking bayonet.

In some embodiments, the fixing member of the hard disk includes a connecting portion connected with the hard disk and a head portion connected with the connecting portion and located outside the hard disk holder. The locking member is provided with a limiting groove. When the connecting portion enters the through hole from the notch, the head portion is located inside the limiting groove.

In some embodiments, the handle includes a pressing plate, each of two sides of the pressing plate is provided with a supporting portion, and each of the supporting portions is provided with a first shaft hole. The first side surface of the hard disk holder is provided with two lugs, the two lugs are provided facing each other with a space therebetween, and each of the two lugs is provided with a second shaft hole. The supporting portion and the lug are connected by the rotating shaft that penetrates the two first shaft holes and the two second shaft holes.

In some embodiments, a limiting hole is provided next to each of the lugs. When the pressing plate rotates around the rotating shaft, the supporting portion rotates inside the limiting hole.

In some embodiments, each of the two supporting portions is provided with a third shaft hole. The third shaft hole is located on the side of the first shaft hole away from the first side surface. The transmission member is a rectangular frame with an opening, the rectangular frame includes a first edge and a second edge which are oppositely arranged, and the opening is located on the second edge. The first edge penetrates the two third shaft holes, and two ends of the second edge in the opening are hinged with the locking member respectively.

In some embodiments, the handle is provided with a counterbore. The first side surface is provided with a boss. The boss is provided with an internal thread hole. When the locking bayonet is engaged with the portion of the fixing member which protrudes from the hard disk holder, the handle and the boss are connected through a screw that connects the counterbore with the internal thread hole.

In some embodiments, the first side surface of the hard disk holder is provided with a first sliding slot that is recessed towards the outside of the hard disk holder. The first sliding slot is located on the side of the locking hole away from the bottom of the hard disk holder, and the first sliding slot corresponds to the locking hole. The fixing member of the hard disk enters the locking hole through the first sliding slot.

In some embodiments, the hard disk holder has a second side surface opposite to the first side surface. An area of the second side surface which is opposite to the locking hole is provided with a second sliding slot.

An embodiment of the present application further provides a main unit, including a chassis and a hard disk fixing device according to the first aspect which is arranged inside the chassis. Since the main unit includes the above hard disk fixing device, the main unit also has the advantages of the hard disk fixing device. Reference may be made to the above description for details which are not detailed here.

BRIEF DESCRIPTION OF THE DRAWINGS

In order to more clearly illustrate the technical solutions in the embodiments of the present application or in the prior art, a brief introduction is presented below to the accompanying drawings used in the description of the embodiments or the prior art. Obviously, the accompanying drawings in the following description are some examples of the application. Those of ordinary skill in the art can further obtain other drawings from these drawings without the exercise of any creative effort.

DETAILED DESCRIPTION OF THE INVENTION

In order to solve the problem of low efficiency in hard disk installation and maintenance, the embodiments of the present application utilize a locking member that can move relative to the hard disk holder to snap and fix the hard disk where a fixing member is installed to the hard disk holder or to release the hard disk from being snapped and fixed. The installation and maintenance process of the hard disk is simple and does not require screws to be tightened multiple times. Therefore, the installation and maintenance efficiency of the hard disk is increased.

To make the above objectives, features and advantages of the embodiments of the present application more obvious and easier to understand, the technical solutions in the embodiments of the present application will be clearly and completely described with reference to the accompanying drawings. Obviously, the embodiments to be described below are merely part other than all of the embodiments of the present application. All other embodiments obtained by those of ordinary skill in the art without the exercise of any creative effort based on the embodiments in the present application fall within the protection scope of the present application.

Figure 4:
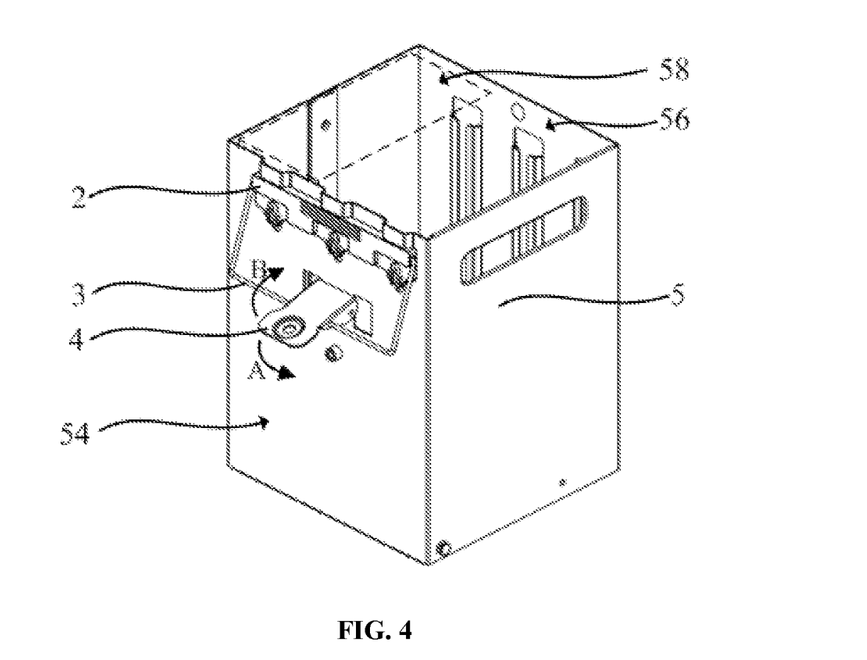
FIG. 4 shows an assembly diagram of a hard disk fixing device in an embodiment of the present application.

With reference to FIG. 4, the hard disk fixing device according to the embodiment of the present application includes: a locking member 2, a transmission member 3, a handle 4 and a hard disk holder 5.

The hard disk holder 5 may be a cube structure with a cavity being provided inside, and the cavity may be divided into several hard disk accommodating cavities 58, which may be the space below dotted lines shown in FIG. 4. In the present embodiment, three hard disk accommodating cavities 58 are provided within the hard disk holder 5, which may be used to accommodate three hard disks. The hard disk holder 5 includes a first side surface 54 and a second side surface 56. The first side surface 54 is opposite to the second side surface 56. The first side surface 54 is provided with a locking hole 52, which is an inverted pyramid hole along the direction from the top to the bottom of the hard disk holder 5. For example, with reference to FIG. 5, taking the orientation of the hard disk holder 5 in FIG. 5 as an example, the locking hole 52 includes an upper rectangular hole portion 521 and an inverted triangular hole portion 522 located below the rectangular hole portion. The rectangular hole portion 521 is a dotted area in FIG. 5, and the inverted triangular hole portion 522 is connected with the rectangular hole portion 521. Such a design makes it convenient for the fixing member on the hard disk to extend out of the hard disk holder from the rectangular hole portion 521. Meanwhile, with the cooperation between the inverted triangular hole portion 522 and the locking member 2, the fixing member is snapped and fixed to improve the fixing effect of the hard disk 1.

Figure 6:
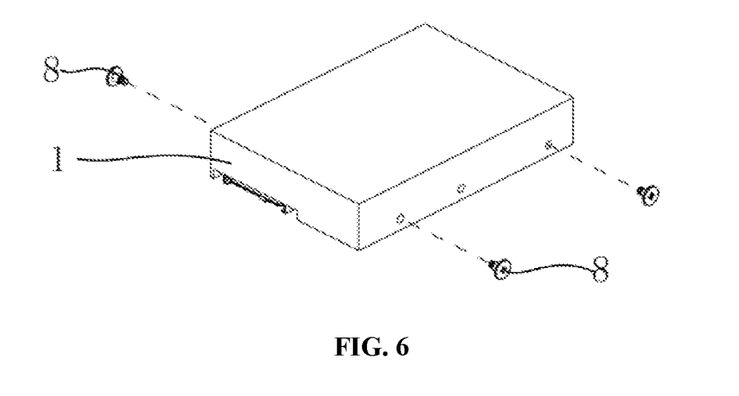
FIG. 6 shows an installation schematic view of a fixing member and a hard disk in an embodiment of the present application.
Figure 7:
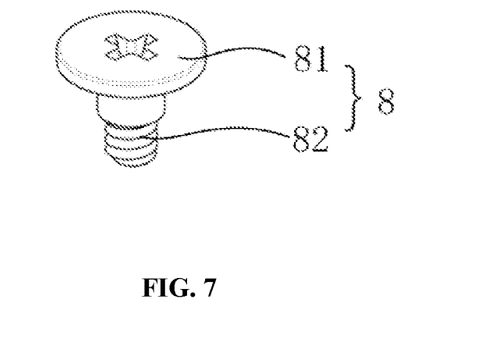
FIG. 7 shows a schematic view of a fixing member in a hard disk in an embodiment of the present application.

One hard disk may be installed in each hard disk accommodating cavity 58. The structure of the hard disk may refer to FIG. 6, wherein the shape of the hard disk 1 may be a cuboid. One side of the hard disk 1 is provided with a fixing member 8. With reference to FIG. 7, the fixing member 8 includes a connecting portion 82 connected with the hard disk 1, and a head portion 81 connected with the connecting portion 82 and located outside the hard disk holder 5. As an example, the fixing member 8 may be a screw, wherein a lead screw of the screw is the connecting portion 82, a nut is the head portion 81, the lead screw is threadedly connected with a side surface of the hard disk 1, and after the hard disk 1 is installed in the hard disk accommodating cavity 58, the nut of the screw extends out of the hard disk holder 5 from the locking hole 52. When the screw enters the locking hole 52 and the hard disk 1 moves towards the bottom of the hard disk holder 5, the lead screw of the screw slides from the rectangular hole portion 521 into the inverted triangular hole portion 522.

It is noteworthy that taking the orientation of the hard disk fixing device in FIG. 4 as an example, the top of the hard disk holder 5 refers to the upper portion of the hard disk holder 5, and the bottom of the hard disk holder 5 refers to the lower portion of the hard disk holder 5. The hard disk accommodating cavity 58 refers to an area in the hard disk holder 5 where each hard disk may be placed. The hard disk holder 5 may be provided with one, two or even more hard disk accommodating cavities 58. The top of each hard disk accommodating cavity 58 has an opening for the hard disk 1 to be placed. The bottom of the hard disk holder 5 may be opened or closed, and the present embodiment is not intended to limit in this regard.

The first side surface 54 of the hard disk holder 5 is further provided with the handle 4. The handle 4 is connected with the first side surface 54 of the hard disk holder 5 through a rotating shaft. The handle 4 can rotate relative to the rotating shaft within a set angle range. The transmission member 3 is connected with the handle 4, the transmission member 3 is rotatably connected with the handle 4, and the rotation center line of the transmission member 3 rotating relative to the handle 4 is parallel to the center line of the rotating shaft. In other words, the rotation axis of the transmission member 3 relative to the handle 4 is parallel to the rotation axis of the handle 4. The locking member is connected with the transmission member, the locking member 2 is rotatably connected with the transmission member 3, and the rotation center line of the locking member 2 rotating relative to the transmission member 3 is parallel to the center line of the rotating shaft. In other words, the rotation axis of the locking member 2 rotating relative to the transmission member 3 is parallel to the rotation axis of the handle 4. The locking member 2 is provided with a locking bayonet 21. The locking bayonet 21 is engaged with the portion of the fixing member 8 that extends out of the hard disk holder 5.

The handle 4 includes a free end and a connecting end, wherein the connecting end is rotatably connected with the first side surface 54 of the hard disk holder 5 through the rotating shaft, and the free end is the end away from the rotating shaft. The rotation direction of the handle 4 includes direction A and direction B in FIG. 4, wherein the direction A and the direction B are opposite to each other. When the hard disk 1 is not installed in the hard disk holder 5, or the hard disk 1 installed in the hard disk holder 5 does not need to be fixed, the handle 4, the transmission member 3 and the locking member 2 are at initial positions, at which point the handle 4 and the first side surface 54 of the hard disk holder 5 form a first angle, and the locking member 2 is attached to the first side surface 54 of the hard disk holder 5.

Figure 8:
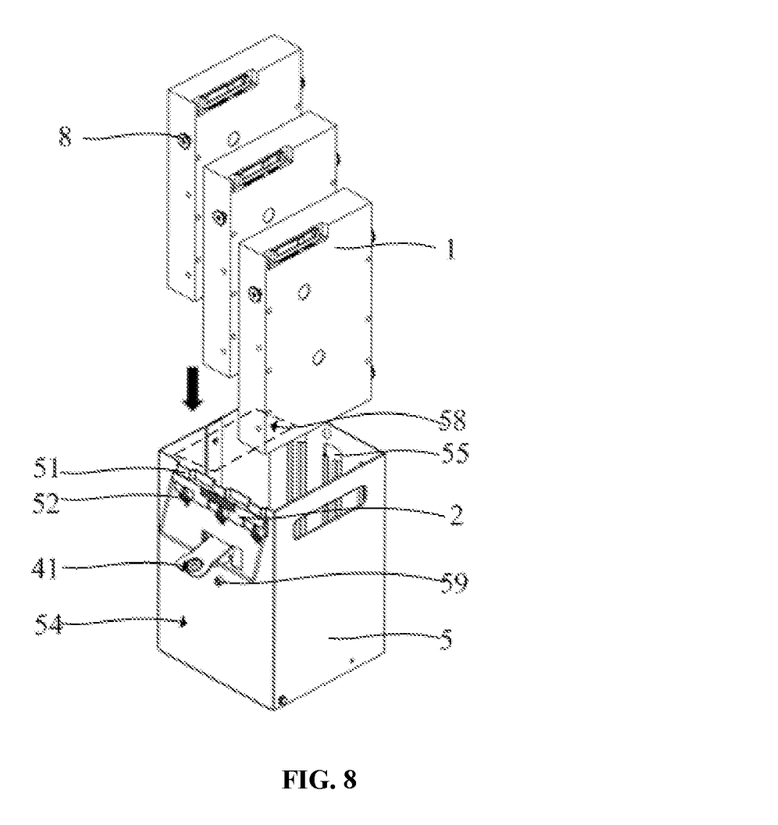
FIG. 8 shows an installation schematic view of a hard disk and a hard disk holder in an embodiment of the present application.

When the hard disk 1 needs to be installed into the hard disk holder 5, as shown in FIG. 8, the hard disk 1 is aligned with the top opening of an empty hard disk accommodating cavity 58, and the hard disk 1 can be loaded from the top opening of the hard disk accommodating cavity 58 under the action of its own gravity or external force, until the fixing member 8 faces a side surface of the bottom of the hard disk holder 5 to be engaged with the locking hole 52.

When the hard disk 1 installed in the hard disk holder 5 needs to be fixed, with reference to FIG. 4, the handle 4 is rotated along the direction A to cause the free end of the handle 4 to be close to the first side surface 54. During rotation of the handle 4, the transmission member 3 connected with the handle 4 also moves to drive the locking member 2 to move towards the direction close to the fixing member 8, until the locking bayonet 21 on the locking member 2 is engaged with the portion of the fixing member 8 that extends out of the hard disk holder 5, so that the fixing member 8 is snapped through the locking member 2, the transmission member 3, the handle 4 and the locking hole 52, and further the hard disk 1 is fixed in the hard disk holder 5.

To prevent the locking member 2 from loosening, in one possible embodiment, the free end of the handle 4 may be fixed on the first side surface 54 of the hard disk holder 5 through the screw. As shown in FIG. 8, for example, the first side surface 54 is provided with a boss 59, the free end of the handle 4 is provided with a counterbore 41, and the screw passes through the counterbore 41 to be threadedly connected to the boss 59, thereby fixing the free end of the handle 4 on the first side surface of the hard disk holder 5. In this way, the handle 4 may be prevented from rotating along the direction B, thereby preventing the locking member 2 from separating from the fixing member 8 and further improving the fixing effect of the hard disk 1.

When the hard disk 1 needs to be removed from the hard disk holder 5, with reference to FIG. 4, the handle 4 is rotated along the direction B, i.e., the free end of the handle 4 is rotated in the direction away from the first side surface 54, and the handle 4 drives the transmission member 3 to move, such that the locking member 2 is driven to move away from the fixing member 8, and the locking bayonet 21 of the locking member 2 is disengaged from the fixing member 8. After the locking bayonet 21 of the locking member 2 is disengaged from the fixing member 8, the locking member 2 may be separated from the first side surface 54 by pulling or shifting the transmission member 3 to prevent the locking member 2 from interfering with the fixing member 8 on the hard disk 1, so as to facilitate the removal of the hard disk 1 from the hard disk holder 5.

Figure 9:
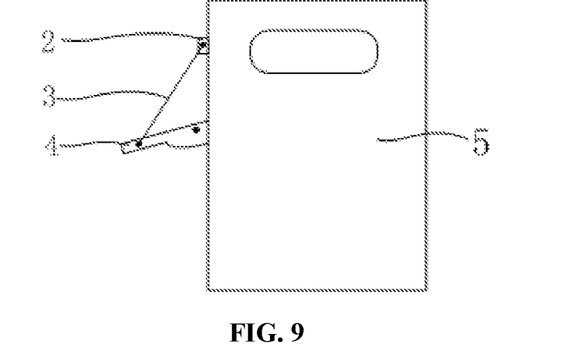
FIG. 9 shows a schematic view of an initial position of the locking member in an embodiment of the present application.
Figure 10:
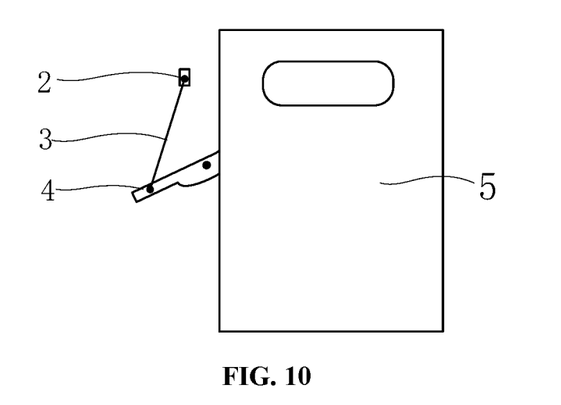
FIG. 10 shows a schematic view of a locking member disengaged from a first side surface in an embodiment of the present application.

When the handle 4, the transmission member 3 and the locking member 2 are at initial positions, as shown in FIG. 9, the locking member 2 is engaged or in contact with the first side surface 54. After the locking bayonet 21 of the locking member 2 is disengaged from the fixing member 8, the locking member 2 may be caused to be separated from the first side surface 54. As shown in FIG. 10, the transmission member 3 may be manually pulled away from the first side surface 54 to separate the locking member 2 from the first side surface 54, and does not stop until the distance between the locking member 2 and the first side surface 54 is greater than the length for which the fixing member 8 extends out of the first side surface 54. Such a design prevents the locking member 2 from interfering with the fixing member 8 when the hard disk 1 is removed in the vertical direction, so that the hard disk 1 can be smoothly taken out of the hard disk holder 5.

The hard disk fixing device provided in the embodiment of the present application includes the handle 4, the transmission member 3, the locking member 2 and the hard disk holder 5. The handle 4 is rotated (e.g., in the direction A in FIG. 4) to drive the transmission member 3 to move, so that the locking member 2 moves relative to the hard disk holder 5, and the locking bayonet 21 of the locking member 2 comes close to the locking hole 52 on the hard disk holder 5. The locking bayonet 21 of the locking member 2 is engaged with the fixing member 8 installed on the hard disk 1, thereby realizing the fixing of the hard disk 1 in the hard disk holder 5. When the handle 4 rotates in the opposite direction (e.g., the direction B in FIG. 4), the handle 4 drives the transmission member 3 to move in the opposite direction, and the transmission member 3 drives the locking member 2 to move in the opposite direction relative to the hard disk holder 5, so that the locking bayonet 21 of the locking member 2 is far away from the locking hole 52 on the hard disk holder 5, and the locking of the hard disk 1 by the locking bayonet 21 of the locking member 2 is released, thereby facilitating the removal of the hard disk 1 from the hard disk holder 5. By means of the above hard disk fixing device, when the hard disk needs to be installed in the hard disk holder or needs to be replaced or repaired, screws do not need to be screwed many times, and there are fewer installation steps, so the installation and maintenance efficiency of the hard disk is high.

In the above embodiment, the locking hole 52 on the first side surface 54 of the hard disk holder 5 is an inverted pyramid hole. To facilitate the hard disk 1 to enter the hard disk holder 5, with reference to FIG. 8, the side of the locking hole 52 away from the bottom of the hard disk holder 5 is provided with a first sliding slot 51. The first sliding slot 51 is recessed towards the outside of the hard disk holder 5, the first sliding slot 51 corresponds to the locking hole 52, and the fixing member 8 of the hard disk 1 enters the locking hole 52 through the first sliding slot.

It is noteworthy that in another embodiment, the first sliding slot 51 may be not provided from the locking hole 52 to the top of the first side surface 54. For example, an opening is provided between the locking hole 52 and the top of the first side surface 54, wherein the opening communicates with the locking hole 52. When the hard disk 1 is installed in the hard disk holder 5, the hard disk 1 is aligned with the hard disk accommodating cavity 58 of the hard disk holder, and the fixing member 8 is aligned with the opening above the locking hole 52. When the hard disk moves towards the bottom the hard disk holder to enter the hard disk accommodating cavity 58, the connecting portion of the fixing member 8 gradually slides into the locking hole 52 from the opening above the locking hole 52, and the head portion of the fixing member 8 is located outside the hard disk holder 5.

In the above embodiment, one side of the hard disk 1 is provided with the fixing member 8, and to prevent the hard disk 1 from shaking in the hard disk accommodating cavity 58, the other side of the hard disk 1 is also provided with the fixing member 8. Accordingly, the second side surface 56 of the hard disk holder 5 is provided with a second sliding slot 55. The second sliding slot 55 is arranged inside the hard disk holder 5 and opposite to the locking hole 52. The first sliding slot 51 may be a short sliding slot, and the second sliding slot may be a short sliding slot or a long sliding slot. When the second sliding slot 55 is a long sliding slot, the second sliding slot 55 extends from the top to the bottom of the hard disk holder 5.

When the hard disk 1 is placed in the hard disk holder 5, the fixing member 8 on the one side slides into the locking hole 52 from the first sliding slot 51, and the fixing member 8 on the other side of the hard disk 1 slides into the hard disk accommodating cavity 58 from the second sliding slot 55. When the fixing member 8 on the one side is in the locking hole 52, the second sliding slot 55 fits with the fixing member 8 on the other side to prevent the hard disk 1 from shaking left and right in the hard disk holder 5. For example, with reference to FIG. 8, the second sliding slot 55 is a T-shaped sliding slot, and the fixing portion 8 on the hard disk 1 which fits with the second sliding slot 55 is a screw. The nut of the screw slides in the slot body of the second sliding slot 55, and the dimension of the nut is larger than that of the opening of the second sliding slot 55 to guarantee that the nut will not release from the opening of the second sliding slot 55. Therefore, the nut moves along the direction of the top and bottom of the hard disk holder 5, and the hard disk 1 is prevented from shaking left and right in the hard disk holder 5.

Figure 5:
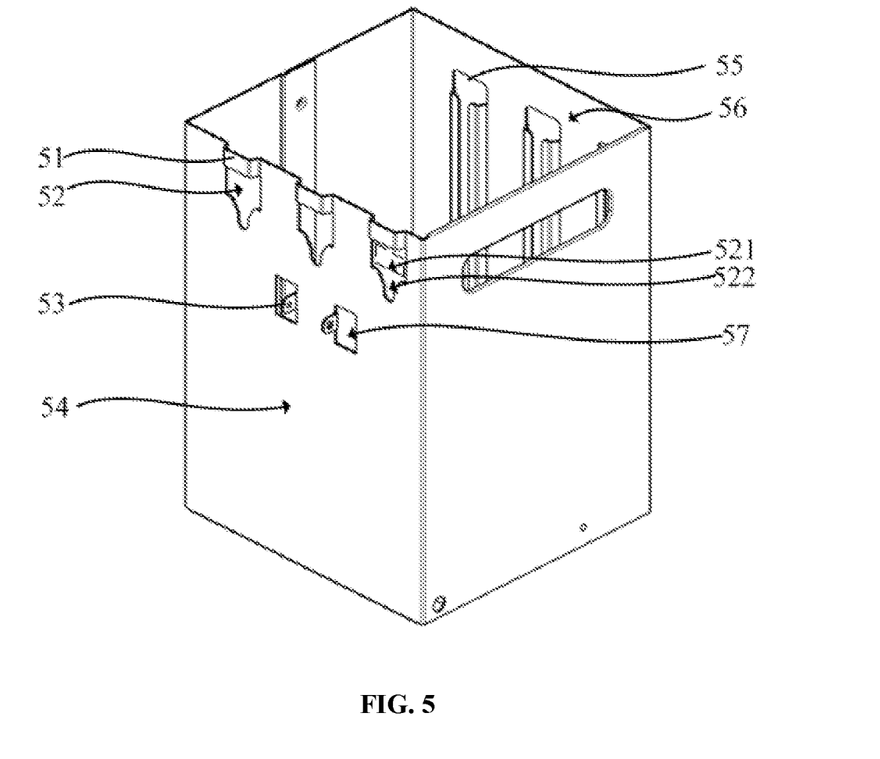
FIG. 5 shows a structural schematic view of a hard disk holder in an embodiment of the present application.

The first side surface 54 of the hard disk holder 5 is further provided with two lugs 53 facing each other with a space therebetween. Each of the two lugs is provided with a second shaft hole for installing the handle 4. A limiting hole 57 is provided next to each lug 53, which may be a rectangular hole as shown in FIG. 5. When the handle 4 rotates relative to the first side surface 54 of the hard disk holder 5, a portion of the handle 4 may pass through the limiting hole 57 to prevent intervention when the handle 4 moves relative to the hard disk holder 5.

Figure 11:
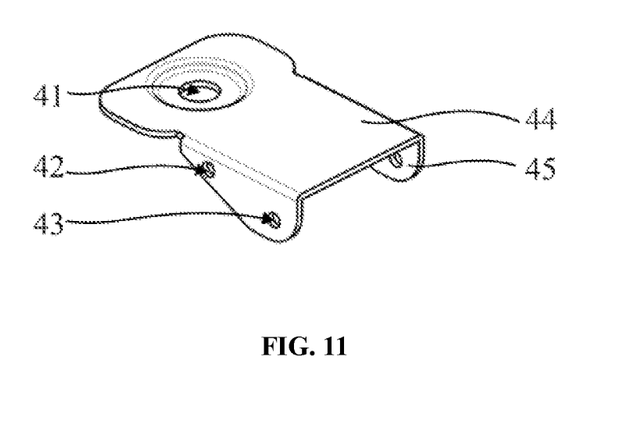
FIG. 11 shows a structural schematic view of a handle in an embodiment of the present application.

The handle 4 includes a pressing plate 44 and a supporting portion 45. With reference to FIG. 11, each of the two sides of the pressing plate 44 is provided with a supporting portion 45, and each of the supporting portions 45 is provided with a first shaft hole 43. The first shaft hole 43 of the handle 4 is aligned with the second shaft hole of the lug 53, and the rotating shaft passes through the first shaft hole 43 and the second shaft hole to realize the rotatable connection between the supporting portion 45 of the handle 4 and the lug 53. By pressing or pulling the end of the pressing plate 44 which is far away from the rotating shaft, the other end of the pressing plate 44 may rotate around the rotating shaft, and the supporting portion 45 of the handle 4 may pass through the limiting hole 57, so that the handle 4 moves relative to the first side surface 54 around the rotating shaft.

It is noteworthy that the supporting portion 45 may be an arc-shaped plate. As shown in FIG. 11, the arc surface of the arc-shaped plate rotates in the limiting hole 57. The two lugs 53 may be provided on the outer side of the two supporting portions 45 or on the inner side of the two supporting portions 45, and the positions of the lugs 53 relative to the supporting portions 45 are not limited here. In addition, the number of the lugs 53 may also be one, at which point the lug 53 is sandwiched between the two supporting portions 45, and the rotating shaft passes through the two first shaft holes 43 and the one second shaft hole to realize the rotatable connection between the supporting portions 45 of the handle 4 and the lug 53.

Figure 12:
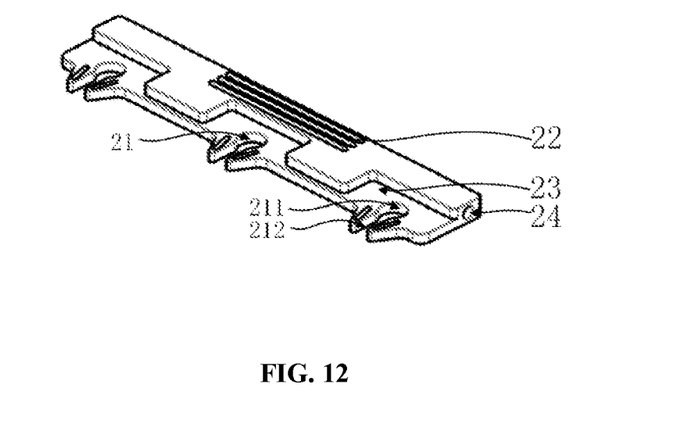
FIG. 12 shows a structural schematic view of a locking member in an embodiment of the present application.

Each of the supporting portions 45 of the handle 4 is further provided with one third shaft hole 42. With reference to FIG. 11, the third shaft hole 42 is located on the side of the first shaft hole 43 away from the first side surface 54 of the hard disk holder 5, and the third shaft hole 42 is rotatably connected with the transmission member 3. The locking member 2 is provided with a fourth shaft hole 24. With reference to FIG. 12, the two opposite side surfaces of the locking member 2 each are provided with one fourth shaft hole 24, wherein the fourth shaft hole 24 is rotatably connected with the transmission member 3. The transmission member 3 is a rectangular frame with an opening, the rectangular frame includes a first edge and a second edge which are oppositely arranged, the opening is located on the second edge, and the transmission member 3 connects the third shaft hole 42 with the fourth shaft hole 24, so that the locking member 2 is connected with the handle 4.

In one possible embodiment, the first edge of the transmission member 3 passes through the two third shaft holes 42 on the handle 4, the two ends of the opening on the second edge of the transmission member 3 each are arranged in the fourth shaft hole 24 of the locking member 2, and the fourth shaft hole 24 may be a counterbore or a through hole. In another possible embodiment, the fourth shaft hole 24 is a through hole, the first edge of the transmission member 3 passes through the fourth shaft hole 24 of the locking member 2, and the two ends of the opening on the second edge of the transmission member 3 each are arranged in the third shaft hole 42. The rectangular frame with the opening of the transmission member 3 may be formed by continuously bending a rod member, and the two bent ends are the two ends of the opening.

A through hole 211 is further arranged on the locking member 2. The through hole 211 penetrates the locking member 2 along the thickness direction of the locking member 2. The side of the through hole 211 facing the bottom of the hard disk holder 5 is provided with a notch 212. The notch 212 and the through hole 211 are connected with each other to form the locking bayonet 21. A limiting groove 23 is arranged on the locking member 2 next to the locking bayonet 21. When the connecting portion of the fixing member 8 of the hard disk 1 enters the through hole 211 from the notch 212, the head portion of the fixing member 8 is located inside the limiting groove 23, and the dimension of the head portion of the fixing member 8 is larger than that of the through hole 211 to prevent the locking member 2 from being disengaged from the fixing member 8.

A pressing portion 22 is further arranged on the locking member 2. With reference to FIG. 12, the pressing portion 22 is uneven stripes arranged on the surface of the locking member 2 to increase the frictional force on the surface of the locking member 2, so that the locking member 2 can be conveniently pressed.

Figure 13:
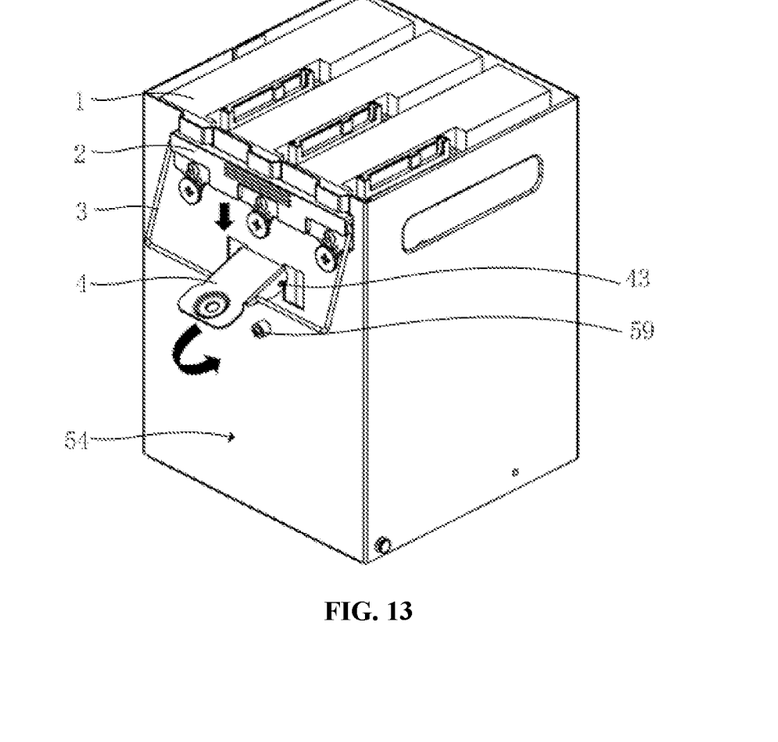
FIG. 13 shows a movement schematic view of a transmission member and a locking member in an embodiment of the present application.
Figure 14:
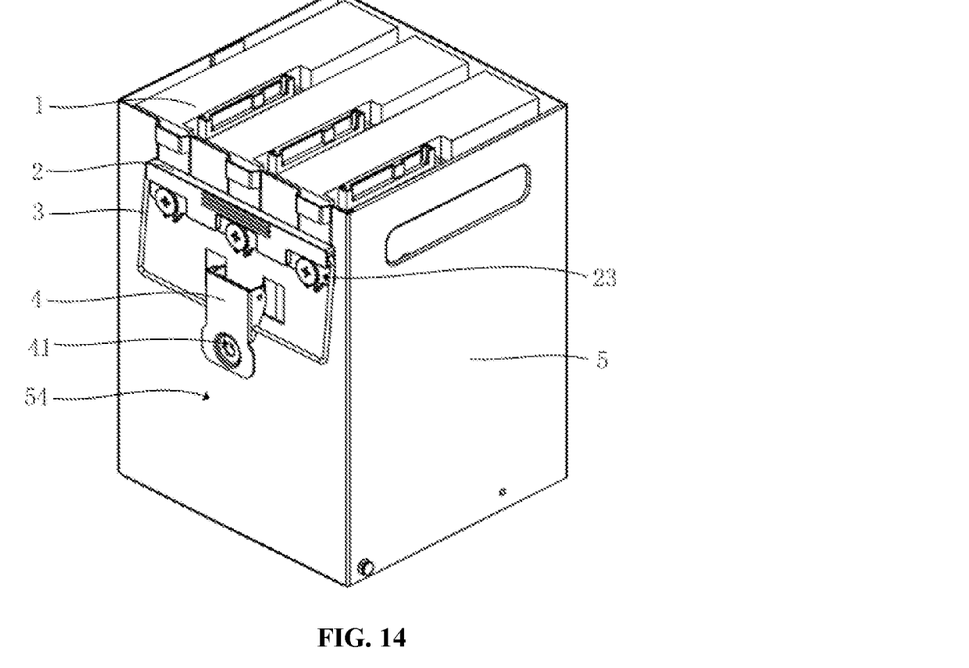
FIG. 14 shows a schematic view after a locking member is locked in an embodiment of the present application.
Figure 15:
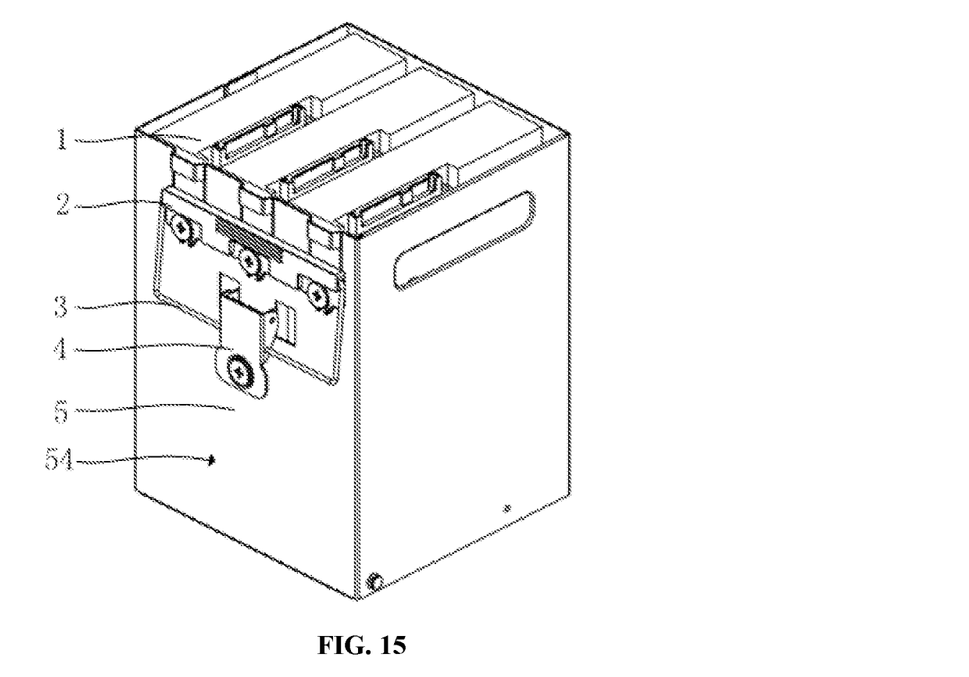
FIG. 15 shows a schematic view after a handle is fixed in an embodiment of the present application.

With reference to FIG. 13 to FIG. 15, the processes of installing the hard disk 1 into the hard disk holder 5 and removing the hard disk 1 from the hard disk holder 5 are described in detail in the context where the fixing members 8 are arranged on both sides of the hard disk 1 and the fixing members 8 are screws. The use of screws as the fixing members of the hard disk takes up less space.

For the convenience of description, the screw disposed in the screw hole on one side of the hard disk 1 is defined as a first screw, and the screw installed in the screw hole on the opposite side is defined as a second screw. In the present embodiment, there are two second screws.

When the hard disk 1 is installed into the hard disk holder 5, the hard disk 1 is aligned with the top opening of a free hard disk accommodating cavity 58, the first screw of the hard disk 1 enters the first sliding slot 51, the second screw enters the second sliding slot 55, and the hard disk 1 is installed from the top opening of the hard disk accommodating cavity 58. After the hard disk 1 is installed in the hard disk holder 5, the shoulder portion of the first screw of the hard disk 1 is located in the locking hole 52, and the head portion of the first screw is located outside the first side surface 54. The head portion of the second screw is located in the second sliding slot 55. In the present embodiment, the number of the hard disk accommodating cavities 58 is three; i.e., three hard disks 1 may be installed in one hard disk holder 5. Accordingly, the numbers of the first sliding slots, the second sliding slots and the locking holes on the hard disk holder 5 are three respectively.

It is noteworthy that before the hard disk 1 is installed in the hard disk holder 5, the locking member 2 is at the initial position, and just as shown in FIG. 9, the locking member 2 is in contact with the first side surface 54. As shown in FIG. 10, the transmission member 3 may be pulled or shifted first to disengage the locking member 2 from the first side surface 54, and then the hard disk 1 is placed. After the hard disk 1 is installed into the hard disk holder 5, the transmission member 3 is pulled or shifted to cause the locking member 2 to be engaged with the first side surface 54 of the hard disk holder 5, and then the handle is rotated after the locking member 2 is at the initial position.

The handle 4 is rotated along the arrow direction shown in FIG. 13 to move close to the first side surface 54 and then drives the transmission member 3 to move, so that the locking member 2 is caused to move towards the first screw of the hard disk 1, till the locking bayonet 21 is engaged with the shoulder portion of the first screw, the head portion of the first screw is located in the limiting groove 23 of the locking member 2 and the dimension of the head portion of the first screw is larger than that of the through hole 211 of the locking bayonet 21. At this point, the handle is at the position as shown in FIG. 14, the locking member 2 is engaged with the first screw, and the transmission member 3 is elastically deformed, thereby further enabling the locking member 2 to lock the hard disk 1. In the present embodiment, the numbers of the locking bayonets 21 and the limiting grooves 23 are three respectively. After three hard disks are all installed into the hard disk holder 5, each locking bayonet 21 is engaged with one hard disk 1, so that the three hard disks are simultaneously fixed in the hard disk holder 5.

The handle 4 is provided with a counterbore 41, a boss 59 is arranged at a corresponding position of the first side surface 54, and the third screw is threadedly connected with the boss 59 through the counterbore 41, thereby fixing the handle 4 on the first side surface 54 to prevent the handle 4 from loosening during large shocks and ensuring that the hard disk 1 can be reliably installed in the hard disk holder 5. After being fixed, the handle is as shown in FIG. 15.

When the hard disk 1 needs to be removed from the hard disk holder 5, first the third screw in the handle 4 is detached, and then the handle 4 is rotated away from the first side surface 54, i.e., the handle 4 is rotated in the direction opposite to the arrow shown in FIG. 13. The transmission member 3 drives the locking member 2 to move far away from the first screw of the hard disk 1, the locking bayonet 21 on the locking member 2 is separated from the first screw, the transmission member 3 is pulled or shifted to separate the locking member 2 from the first side surface 54, and the hard disk 1 is taken out of the hard disk holder 5.

The hard disk fixing device provided in the embodiment of the present application includes the handle 4, the transmission member 3, the locking member 2 and the hard disk holder 5. The handle 4 is rotated to drive the transmission member 3 to move, so that the locking member 2 is driven to move relative to the hard disk holder 5, and the locking bayonet 21 of the locking member 2 comes close to the locking hole 52 on the hard disk holder 5. The locking bayonet 21 of the locking member 2 is engaged with the fixing member 8 installed on the hard disk 1, thereby realizing the fixing of the hard disk 1 in the hard disk holder 5. When the handle 4 rotates in the opposite direction, the handle 4 drives the transmission member 3 to move in the opposite direction, and the transmission member 3 drives the locking member 2 to move in the opposite direction relative to the hard disk holder 5, so as to cause the locking bayonet 21 of the locking member 2 to be far away from the locking hole 52 on the hard disk holder 5 and to release the locking of the hard disk 1 by the locking bayonet 21 of the locking member 2, thereby realizing the loosening of the hard disk 1 from the hard disk holder 5. By means of the above hard disk fixing device, when the hard disk needs to be installed in the hard disk holder or needs to be replaced or repaired, screws do not need to be screwed many times, and there are fewer installation steps, so the installation and maintenance efficiency of the hard disk is high.

In another aspect of the embodiment of the present application, a main unit is provided, which includes a chassis with the above hard disk fixing device provided therein. With the above hard disk fixing device, when the hard disk needs to be installed in the hard disk holder or needs to be replaced or repaired, screws do not need to be screwed many times, and there are fewer installation steps, so the installation and maintenance efficiency of the hard disk is high.

Various embodiments or examples in the present specification are described in a progressive manner. Each embodiment focuses on the differences from other embodiments. The same and similar parts of the various embodiments can be referred to each other.

In the description of the present specification, descriptions with reference to the term "one embodiment", "some embodiments", "illustrative embodiments", "example", "specific example", "some examples" or the like mean that a specific feature, structure, material or characteristic described in connection with the embodiment or example is included in at least one embodiment or example of the present application. In the present specification, schematic expressions of the above terms do not necessarily refer to the same embodiment or example. Moreover, the specific feature, structure, material or characteristic described herein may be combined appropriately in any one or more embodiments or examples.

Finally, it is noteworthy that the foregoing embodiments are merely used to illustrate the technical solutions of the present application rather than limiting. Although the present application has been illustrated in detail with reference to the foregoing embodiments, those of ordinary skill in the art should understand that they can still modify the technical solutions described in the foregoing embodiments or perform equivalent substitutions on some or all of the technical features therein. These modifications or substitutions do not make the essence of the corresponding technical solution depart from the scope of the technical solutions in the various embodiments of the present application.

What is claimed is:

1. A hard disk fixing device, comprising:
   a hard disk holder, wherein the hard disk holder is provided with a hard disk accommodating cavity extending from its top to bottom, the hard disk accommodating cavity being used to install a hard disk with a fixing member, and a first side surface of the hard disk holder is provided with a locking hole facing and connected with the hard disk accommodating cavity, the locking hole being used for the fixing member to protrude from the hard disk holder;
   a handle connected with the first side surface of the hard disk holder;
   a transmission member, wherein the transmission member is rotatably connected with the handle; and
   a locking member, wherein the locking member is rotatably connected with the transmission member, and the locking member is provided with a locking bayonet, the locking bayonet being engaged with a portion of the fixing member which protrudes from the hard disk holder;
   wherein the locking member is provided with a through hole, the through hole penetrating the locking member along the thickness direction of the locking member, the side of the through hole facing the bottom of the hard disk holder being provided with a notch, the notch and the through hole being connected with each other to form the locking bayonet.

2. The hard disk fixing device according to claim 1, wherein the fixing member of the hard disk comprises a connecting portion connected with the hard disk and a head portion connected with the connecting portion and located outside the hard disk holder;
   the locking member is provided with a limiting groove, and when the connecting portion enters the through hole from the notch, the head portion is located inside the limiting groove.

3. The hard disk fixing device according to claim 2, wherein a limiting hole is provided next to each of the lugs, and when the pressing plate rotates, the supporting portion rotates inside the limiting hole.

4. The hard disk fixing device according to claim 3, wherein the handle is provided with a counterbore, the first side surface is provided with a boss, the boss being provided with an internal thread hole, and when the locking bayonet is engaged with the portion of the fixing member which protrudes from the hard disk holder, the handle and the boss are connected through a screw that connects the counterbore with the internal thread hole.

5. The hard disk fixing device according to claim 4, wherein the hard disk holder has a second side surface opposite to the first side surface, and an area of the second side surface which is opposite to the locking hole is provided with a second sliding slot.

6. The hard disk fixing device according to claim 2, wherein each of the two supporting portions is provided with a third shaft hole, the third shaft hole being located on the side of the first shaft hole away from the first side surface;

the transmission member is a rectangular frame with an opening, the rectangular frame comprising a first edge and a second edge which are oppositely arranged, the opening being located on the second edge; the first edge penetrates the two third shaft holes, two ends of the second edge in the opening being hinged with the locking member respectively.

7. The hard disk fixing device according to claim 1, wherein the handle comprises a pressing plate, each of two sides of the pressing plate being provided with a supporting portion, and each of the supporting portions being provided with a first shaft hole;

the first side surface of the hard disk holder is provided with two lugs, the two lugs being provided facing each other with a space therebetween, and each of the two lugs being provided with a second shaft hole; and the supporting portion and the lug are connected.

8. The hard disk fixing device according to claim 1, wherein the first side surface of the hard disk holder is provided with a first sliding slot that is recessed towards the outside of the hard disk holder, the first sliding slot being located on the side of the locking hole away from the bottom of the hard disk holder, the first sliding slot corresponding to the locking hole, and the fixing member of the hard disk entering the locking hole through the first sliding slot.

9. The hard disk fixing device according to claim 1, wherein the hard disk holder has a second side surface opposite to the first side surface, and an area of the second side surface which is opposite to the locking hole is provided with a second sliding slot.

10. The hard disk fixing device according to claim 1, wherein the handle comprises a pressing plate, each of two sides of the pressing plate being provided with a supporting portion, and each of the supporting portions being provided with a first shaft hole;

the first side surface of the hard disk holder is provided with two lugs, the two lugs being provided facing each other with a space therebetween, and each of the two lugs being provided with a second shaft hole; and the supporting portion and the lug are connected.

11. The hard disk fixing device according to claim 1, wherein the handle comprises a pressing plate, each of two sides of the pressing plate being provided with a supporting portion, and each of the supporting portions being provided with a first shaft hole;

the first side surface of the hard disk holder is provided with two lugs, the two lugs being provided facing each other with a space therebetween, and each of the two lugs being provided with a second shaft hole; and the supporting portion and the lug are connected.

* * * * *